(12) United States Patent
Winter et al.

(10) Patent No.: US 7,878,298 B2
(45) Date of Patent: Feb. 1, 2011

(54) FUEL-CELL EXHAUST SYSTEM

(75) Inventors: Franz Winter, Mainz (DE); Wolfgang Heil, Gross-Gerau (DE); Steffen Doenitz, Darmstadt (DE); Michael J. Gorman, Pinckney, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 932 days.

(21) Appl. No.: 11/612,150

(22) Filed: Dec. 18, 2006

(65) Prior Publication Data
US 2008/0141667 A1    Jun. 19, 2008

(51) Int. Cl.
*F01N 13/08* (2010.01)
*F01N 1/00* (2006.01)
*F01N 1/02* (2006.01)
*F01N 1/08* (2006.01)
*F01N 1/10* (2006.01)
*F01N 1/24* (2006.01)

(52) U.S. Cl. .................. 181/227; 181/247; 181/248; 181/249; 181/252; 181/256; 181/258; 181/268; 60/324; 429/34

(58) Field of Classification Search ............. 181/227, 181/256, 252, 268, 249, 247, 248, 258; 60/324; 429/34
See application file for complete search history.

(56) References Cited

U.S. PATENT DOCUMENTS

| | | | | | |
|---|---|---|---|---|---|
| 2,808,896 | A | * | 10/1957 | Wilman | 181/228 |
| 3,418,169 | A | * | 12/1968 | Matsen et al. | 429/450 |
| 5,025,890 | A | * | 6/1991 | Hisashige et al. | 181/272 |
| 5,266,755 | A | * | 11/1993 | Chien | 181/252 |
| 5,340,952 | A | * | 8/1994 | Takiguchi | 181/282 |
| 5,365,025 | A | * | 11/1994 | Kraai et al. | 181/249 |
| 5,849,251 | A | * | 12/1998 | Timko | 422/177 |
| 5,937,908 | A | * | 8/1999 | Inoshiri et al. | 138/39 |
| 6,283,162 | B1 | * | 9/2001 | Butler | 138/177 |
| 6,478,340 | B1 | * | 11/2002 | Butler | 285/131.1 |
| 6,729,354 | B2 | * | 5/2004 | Ishizu et al. | 138/109 |
| 7,484,590 | B2 | * | 2/2009 | Jeon et al. | 181/227 |
| 7,694,778 | B2 | * | 4/2010 | Toyoshima et al. | 181/268 |
| 2003/0054222 | A1 | * | 3/2003 | Horiuchi et al. | 429/34 |
| 2004/0149515 | A1 | * | 8/2004 | Toyoshima | 181/258 |
| 2005/0064255 | A1 | * | 3/2005 | Blaszczyk et al. | 429/19 |
| 2005/0118471 | A1 | * | 6/2005 | Fukuma et al. | 429/22 |
| 2005/0161283 | A1 | * | 7/2005 | Emler | 181/249 |
| 2006/0113145 | A1 | * | 6/2006 | Toyoshima et al. | 181/268 |
| 2008/0185218 | A1 | * | 8/2008 | Kondo et al. | 181/252 |
| 2008/0311433 | A1 | * | 12/2008 | Fujita | 429/12 |
| 2009/0045006 | A1 | * | 2/2009 | Kondo et al. | 181/252 |

* cited by examiner

*Primary Examiner*—Elvin G Enad
*Assistant Examiner*—Christina Russell
(74) *Attorney, Agent, or Firm*—Reising Ethington P.C.

(57) ABSTRACT

One embodiment of the invention includes a product including a fuel-cell exhaust diffuser; an air funnel; and at least two exhaust tubes attached to the diffuser.

15 Claims, 3 Drawing Sheets

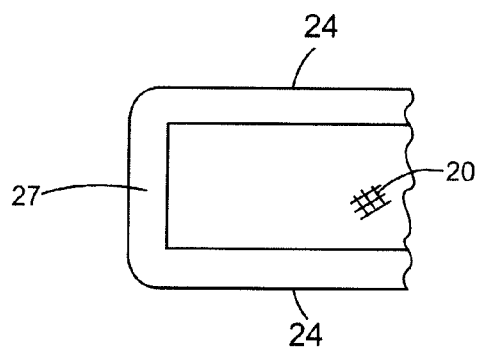
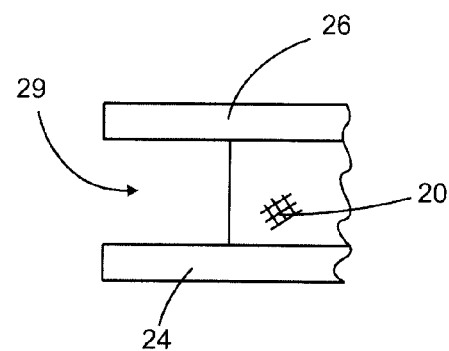
Fig.3   Fig.4
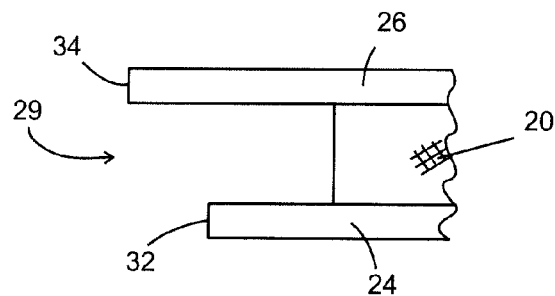
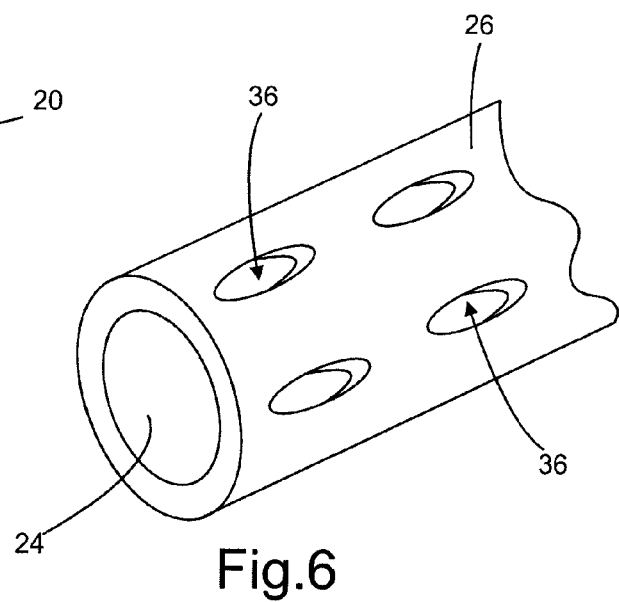
Fig.5   Fig.6

FUEL-CELL EXHAUST SYSTEM

TECHNICAL FIELD

The present disclosure relates generally to fuel-cell exhaust systems and components thereof.

BACKGROUND

Automotive vehicles may be powered by fuel-cell power units. These fuel-cell units can sometimes be attached to exhaust pipes.

SUMMARY

One embodiment of the present invention may include a product comprising a fuel-cell vehicle exhaust diffuser, an air funnel and at least two exhaust tubes attached to the diffuser.

Another embodiment of the present invention may include a product comprising a fuel-cell vehicle exhaust system, at least two exhaust tubes attached to the diffuser and the exhaust tube having an inner and outer wall.

An additional embodiment of the present invention may include a method comprising providing a fuel-cell exhaust system, funneling fuel-cell exhaust into a diffuser, reducing fuel-cell exhaust volume and dividing the exhaust among at least 2 exhaust tubes.

DESCRIPTION OF THE DRAWINGS

The present invention will become more fully understood from the detailed description and the accompanying drawings, wherein:

FIG. 3 shows a sectional side view of the atmospheric end of an exhaust tube according to one embodiment of the invention.

FIG. 4 shows a sectional side view of another possible embodiment of the atmospheric end of an exhaust tube wall.

FIG. 5 shows a sectional side view of yet another embodiment of the atmospheric end of an exhaust tube wall.

FIG. 6 shows a perspective view of an exhaust tube section using drainage holes according to one embodiment of the invention.

DESCRIPTION OF EXEMPLARY EMBODIMENTS

The following description of embodiment(s) is merely exemplary in nature and is in no way intended to limit the invention, its application, or uses.

Figure 1:
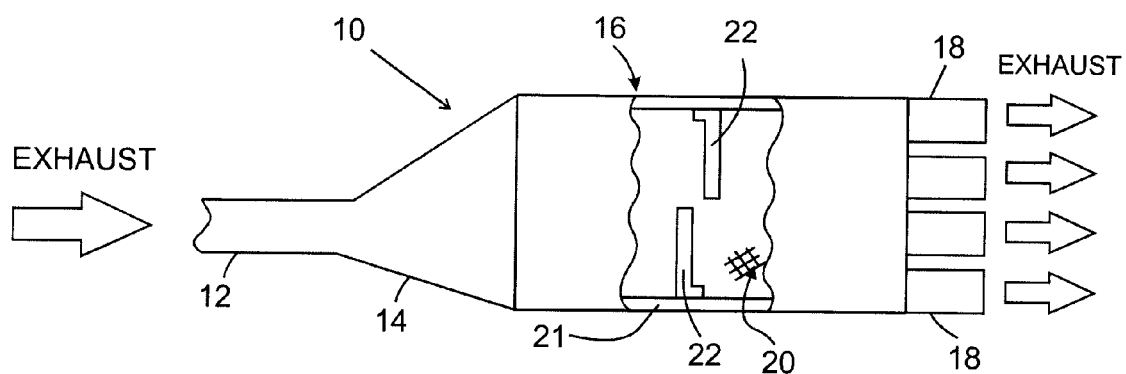
FIG. 1 shows a perspective view the fuel cell exhaust pipe, the air funnel, a diffuser and four exhaust tubes according to one embodiment of the invention.

FIG. 1 generally shows one embodiment of a fuel-cell vehicle exhaust system 10 that may include a fuel-cell powerplant exhaust pipe 12, an air funnel 14, fuel-cell exhaust diffuser 16, and exhaust tubes 18. The exhaust system 10 may be attached to a fuel-cell stack (not shown). The fuel-cell stack uses a fuel, such as hydrogen, to generate electrical power which operates a vehicle or other machinery.

A fuel-cell exhaust pipe 12 acts as a conduit between the fuel-cell stack and the fuel-cell exhaust system 10. In one embodiment, the fuel-cell exhaust travels from the fuel-cell stack through the exhaust pipe 12 to the air funnel 14, the diffuser 16 and exhaust tubes 18 into the atmosphere. The exhaust pipe 12 can be tubular in cross-section, but can also be fashioned from many other suitable cross-sectional shapes. The exhaust pipe 12 may be constructed from a metal, such as steel or aluminum, or may be made from a composite material.

Situated between the fuel-cell exhaust pipe 12 and the fuel-cell exhaust diffuser 16 is the air funnel 14. The air funnel 14 may focus the exhaust gas from the exhaust pipe 12 into the exhaust diffuser 16. The air funnel 14 can be conically shaped but other embodiments may also use a pyramid shape or any other shape that can funnel gas or vapor. Like the exhaust pipe 12, the air funnel 14 may be manufactured from a metal, such as steel or aluminum, or may be made from a composite material.

After the exhaust gas exits the air funnel 14, it enters the exhaust diffuser 16. The diffuser 16 acts to reduce exhaust noise emitted from the fuel-cell unit. The diffuser 16 may have a rectangular shape, but in other embodiments the shape may be square, cylindrical or another shape that can be filled with sound insulation or baffles. Exhaust noise reduction may be accomplished using a combination of acoustical absorption material 20 or acoustical reflection, for example by baffles 22. Therefore, the diffuser 16 may be filled with some type of acoustical absorption material 20. In different embodiments, the diffuser 16 may be either partially or fully filled with acoustical absorption material 20. This material may be stainless steel wool, fiberglass wool, or any other material that reduces noise and is long-lasting.

In addition to the acoustical absorption material 20 or as an alternative, the diffuser 16 also may use acoustical reflection in the form of baffles 22 built into the diffuser 16 and may extend from an outer wall 21 of the diffuser 16 inwardly toward the center of a cavity defined by the diffuser 16. These baffles 22 may be perpendicular to the direction of exhaust gas travel, but in other embodiments could also be oriented in any manner so as to further reduce exhaust gas noise. The baffles 22 could have various sizes and locations within the diffuser 16 depending on the application requirements. The diffuser 16 and baffles 22 may be manufactured from metal, such as steel or aluminum, or may be made from a composite material.

Exhaust tubes 18 connect to the diffuser 16 carrying exhaust gas into the atmosphere. The exhaust tubes 18 may work in conjunction with the diffuser 16 to further reduce the exhaust gas noise. Depending on the application, there may be at least two exhaust tubes 18 connected to the diffuser 16, but in other embodiments more exhaust tubes 18 may be used. The tubular exhaust tubes 18 may be circular in cross-sectional shape, but may also be square, triangular or any other cross-sectional shape suited for transmitting gas.

Figure 2:
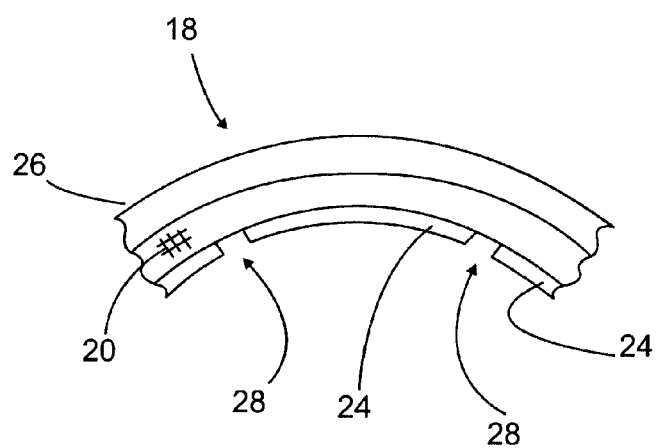
FIG. 2 shows a semi-circular sectional view of one exhaust tube according to one embodiment of the invention.

As shown in FIG. 2, the exhaust tubes 18 have an inner exhaust tube wall 24 and an outer exhaust tube wall 26. The distance between these two walls 24, 26 may vary depending on such things as exhaust flow volume, the amount of acoustical absorption material 20 or other packaging and performance design requirements. The acoustical absorption material 20 may have the same properties as the absorption material used in the diffuser, or may be any suitable material to reduce the sound volume of exhaust gas. The inner exhaust wall 24 may contain perforations 28 providing the acoustical material greater contact with the exhaust and in return more effectively reduces the exhaust noise. The number of perforations 28 per square inch can vary depending on design requirements.

Furthermore, FIGS. 3-5 illustrate select alternative embodiments of the atmospheric end of the exhaust tubes 18. As shown in FIG. 3, the space between the inner wall 24 and outer wall 26 may be sealed by a solid end 27. The solid end 27 may be of any suitable material including a metal, such as steel or aluminum, or a composite material. It is possible to make the cap from the same material as the tubes 18, or from a different material.

An alternative embodiment of the exhaust tubes 18 is shown in FIG. 4. In this embodiment the exhaust tube 18 has an open end 29 that may be located between the inner wall 24 and outer wall 26. Alternatively, FIG. 5 illustrates an embodiment of the exhaust tubes 18 having an inner wall 24, an outer wall 26, acoustical absorption material 20 and an open end 29. The outer wall 26 has an end 34 that extends beyond the end 32 of the inner wall 24.

Figure 7:
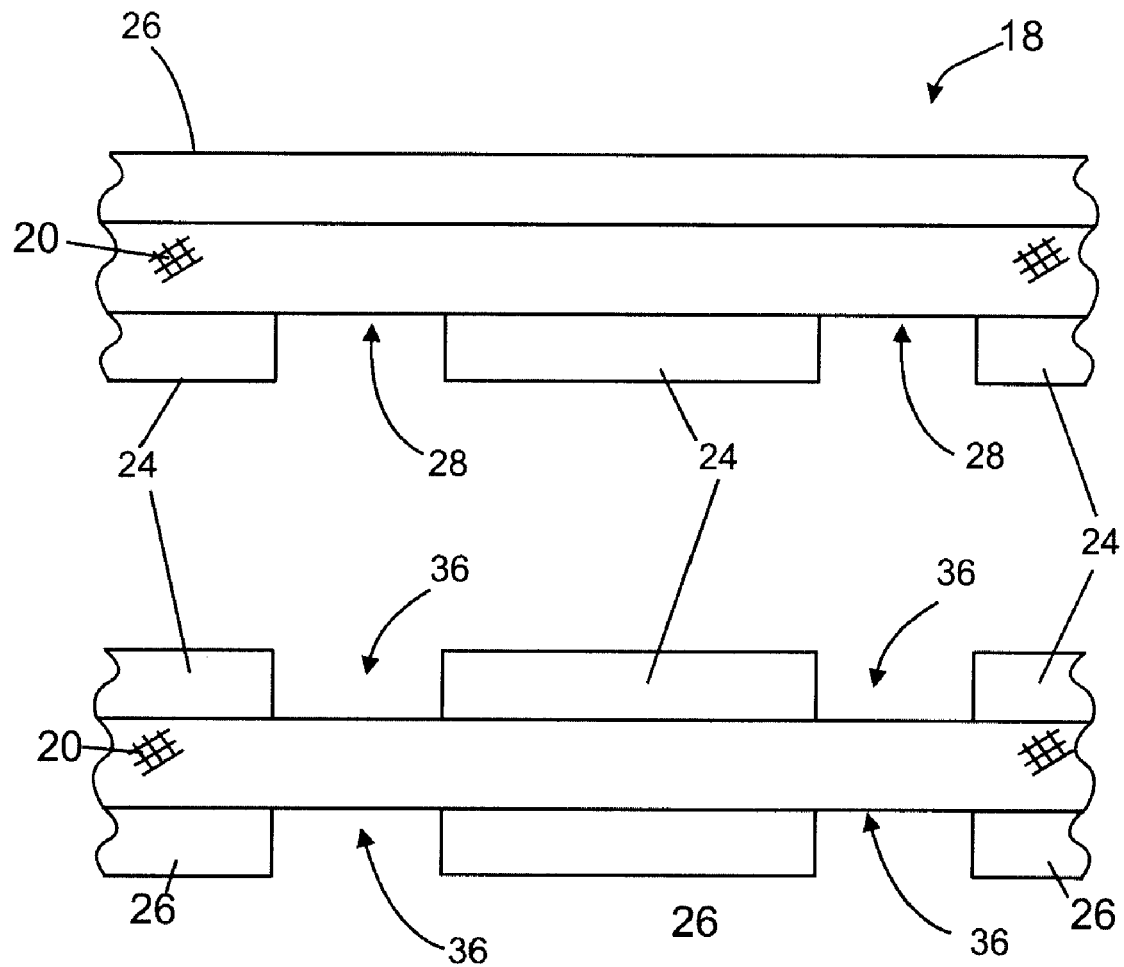
FIG. 7 shows a side view of an exhaust tube section illustrating both drainage holes and perforations according to one embodiment of the invention.

FIGS. 6 and 7 illustrate alternative embodiments wherein the exhaust tube 18 includes drainage holes 36. The drainage holes 36 traverse the inner wall 24 and outer wall 26 of the exhaust tubes 18 and are located closest to the ground during normal vehicle operations. In one embodiment, the drainage holes 36 are less than 5 mm but can be of various sizes in different embodiments. One function these drainage holes 36 serve is to release accumulated moisture from the exhaust tubes 18, but could also drain any other solid, liquid or gas. The drainage holes 36 may be unobstructed by the acoustical absorption material 20 or the holes may function with the material 20 filling the drainage holes 36.

The above description of certain embodiments of the invention is merely exemplary in nature and, thus, variations, modifications and/or substitutions thereof are not to be regarded as a departure from the spirit and scope of the invention. An apparatus or assembly embodying the present invention may have none, some, or all of the noted features and/or advantages. That certain features are included in the presently preferred embodiments set forth herein should not be constructed to mean that all embodiments of the present invention must have such features.

What is claimed is:

1. A product comprising:
   a fuel-cell exhaust diffuser;
   an air funnel having a conical or pyramid shape, the funnel having a first end attached to the diffuser; and
   at least two exhaust tubes attached to the diffuser wherein the exhaust tubes comprise tubular inner and outer walls, the inner wall and outer wall being spaced apart from each other and wherein the inner wall and the outer wall extend axially and are generally concentric.

2. A product, as set forth in claim 1, further comprising an acoustical absorption material received in the diffuser for reducing exhaust noise.

3. A product, as set forth in claim 1, wherein the diffuser further comprises baffles positioned for acoustical reflection to reduce exhaust noise.

4. A product, as set forth in claim 1, wherein the air funnel is constructed and arranged to spread the exhaust evenly among the exhaust tubes.

5. A product, as set forth in claim 1, further comprising an acoustic absorption material between the inner wall and outer wall of the exhaust.

6. A product, as set forth in claim 1, wherein the inner wall of the exhaust tube is perforated.

7. A product, as set forth in claim 1, wherein the exhaust tubes have small holes traversing the inner wall and outer wall of the exhaust tubes for draining liquid.

8. A product comprising:
   a fuel-cell vehicle exhaust system including a diffuser; an air funnel and exhaust pipe, wherein the diffuser has a greater cross-section exhaust flow area than the exhaust pipe, the air funnel being interposed between the exhaust pipe and the diffuser, wherein a first end of the funnel is connected to the diffuser and a second end of the funnel is connected to the exhaust pipe and wherein there are at least two exhaust tubes attached to the diffuser, wherein each exhaust tubes comprises tubular inner and outer walls, the inner wall and outer wall being spaced apart from each other and wherein the inner wall and the outer wall extend axially and are generally concentric.

9. A product, as set forth in claim 8, wherein the exhaust tubes inner walls have perforations therethrough.

10. A product, as set forth in claim 9, wherein the exhaust tubes inner wall and outer wall sandwich an acoustical absorption material therebetween.

11. A product, as set forth in claim 9, wherein small drainage holes traverse the inner wall and outer wall.

12. A product comprising a fuel cell exhaust system comprising an acoustic absorption material constructed and arranged to flow exhaust over the acoustic absorption material to reduce exhaust noise, the exhaust system further comprising an exhaust pipe connected to a diffuser, and wherein the diffuser is downstream of the exhaust pipe and wherein the acoustic absorption material is in the diffuser, and further comprising at least one exhaust tube downstream of the exhaust pipe, and wherein the exhaust tube comprises an axially extending outer wall and an axially extending inner wall with a space there between and wherein the acoustic absorption material is received in the space.

13. A product as set forth in claim 12 wherein the diffuser has a greater cross-section exhaust flow area than the exhaust pipe.

14. A product as set forth in claim 12 wherein the diffuser comprises an outer wall defining an inner cavity, the diffuser further comprises baffles extending from the outer wall into the cavity.

15. A product as set forth in claim 12 comprising a funnel interposed between the exhaust pipe and the diffuser.

* * * * *